US00RE42694E

(19) United States
(12) Reissued Patent
Coffee

(10) Patent Number: US RE42,694 E
(45) Date of Reissued Patent: Sep. 13, 2011

(54) METHOD AND SYSTEMS FOR PROVIDING COMMUNICATIONS SERVICES

(75) Inventor: Michael B. Coffee, Roswell, GA (US)

(73) Assignee: Writeback Technologies, L.L.C., Wilmington, DE (US)

(21) Appl. No.: 11/889,838

(22) Filed: Aug. 16, 2007

Related U.S. Patent Documents

Reissue of:
(64) Patent No.: 6,931,111
Issued: Aug. 16, 2005
Appl. No.: 09/718,661
Filed: Nov. 22, 2000

U.S. Applications:
(60) Provisional application No. 60/167,207, filed on Nov. 24, 1999.

(51) Int. Cl.
*G06F 15/16* (2006.01)
(52) U.S. Cl. ..... 379/201.12; 719/328; 709/203
(58) Field of Classification Search ..... 709/224, 709/225, 226, 203
See application file for complete search history.

(56) References Cited

U.S. PATENT DOCUMENTS

| | | | | |
|---|---|---|---|---|
| 6,188,757 | B1 | 2/2001 | Malik | |
| 6,226,286 | B1 | 5/2001 | Danne et al. | |
| 6,330,586 | B1 * | 12/2001 | Yates et al. | 709/201 |
| 6,463,145 | B1 | 10/2002 | O'Neal et al. | |
| 6,477,243 | B1 * | 11/2002 | Choksi et al. | 379/100.06 |
| 6,510,216 | B1 | 1/2003 | Burr et al. | |
| 6,714,973 | B1 * | 3/2004 | Heiske et al. | 709/223 |
| 6,728,238 | B1 * | 4/2004 | Long et al. | 370/352 |
| 7,055,042 | B1 * | 5/2006 | Gough et al. | 726/19 |
| 7,142,530 | B1 * | 11/2006 | Chewning et al. | 370/351 |
| 2002/0013777 | A1 | 1/2002 | Diener | |
| 2005/0004978 | A1 * | 1/2005 | Reed et al. | 709/203 |
| 2005/0027797 | A1 * | 2/2005 | San Andres et al. | 709/203 |
| 2005/0080896 | A1 * | 4/2005 | Wu | 709/224 |
| 2005/0216421 | A1 * | 9/2005 | Barry et al. | 705/64 |
| 2009/0037435 | A1 * | 2/2009 | Fernandez et al. | 707/10 |
| 2009/0150486 | A1 * | 6/2009 | Franco et al. | 709/203 |
| 2010/0023630 | A1 * | 1/2010 | Mendez et al. | 709/229 |

OTHER PUBLICATIONS

Howell, Cary, "The Application Service Provider," TechLinks, Nov./Dec. 1999, pp. 22-24, vol. 2, No. 6.
"ASP Galaxy Goes Supernova," Interactive Week, Oct. 18, 1999, pp. 88-91.

* cited by examiner

*Primary Examiner* — Creighton Smith
(74) *Attorney, Agent, or Firm* — Sterne, Kessler, Goldstein & Fox P.L.L.C.

(57) ABSTRACT

Systems and methods are disclosed that allow a user to access communications services using a service node or a computer suitably connected to a communications-applications support system at a service provider's facility. The user is provided with information as to the communications services available. These services may be ordered for implementation on and use with the service node or the user's computer or on the computer used in connection with the support system. The implementation and performance of the communications services for the user be monitored, and if substandard, then remedial action may be taken by the system. Also, upgrades, maintenance, and new services may be transferred from the system to the user's computer as appropriate. Advantageously, the user is relieved from provisioning, configuring, maintaining, updating, or educating individuals about these communications services.

284 Claims, 4 Drawing Sheets

METHOD AND SYSTEMS FOR PROVIDING COMMUNICATIONS SERVICES

Matter enclosed in heavy brackets [ ] appears in the original patent but forms no part of this reissue specification; matter printed in italics indicates the additions made by reissue.

CROSS-REFERENCE TO RELATED APPLICATION

The present application claims priority to and the benefit of the prior filed and commonly owned provisional application entitled "Methods, Systems, and Apparatus for Providing Communications Services", filed in the United States Patent and Trademark Office on Nov. 24, 1999, assigned Application No. 60/167,207, and incorporated herein by reference.

FIELD OF THE INVENTION

The present inventions relate to the field of communications, and particularly relate to the field of on-line communications systems and services that may be provided to a user through the use of a server at a remote location and the use of a computer, service node or other intelligent peripheral on the user's premises or under the user's control.

BACKGROUND

Modern communications systems have developed over the last 120 years from the circuit-switched public telephone network (PSTN) to an all-digital integrated-media communications transport system such as the global communications network referred to as the Internet. Businesses and other institutions look to modern communications systems for more than just services. Businesses and others look for assistance in improving productivity, providing better customer service, and assisting in other areas. In fact, the effective utilization of modern communication systems is typically considered to be a prerequisite to successful competition in the information- and service-based economies of the early twenty-first century.

To successfully compete, a business or similar institution may have to have the following communication tools: effective call processing; integrated messaging (voice, fax, and data); a presence on a global communications network such as a Web site or other presence on the World Wide Web; electronic commerce (e-commerce); automated facsimile (fax) processing with broadcast capabilities; effective customer/client connectivity with information sharing (so-called Extranets); knowledge management; file and print services; remote access for telecommuting and traveling members of the business and other people such as customers, vendors, and the like.

Today, however, generally only the largest businesses have more than a few of these competitive communications tools. Small-to-medium-sized businesses and similar institutions generally are equipped with telephone equipment and a simple fax machine. It is unusual for a small-to-medium-sized business to have additional competitive communications tools.

What prevents a small-to-medium-sized business from having advanced competitive communications tools? An answer to this question is that the acquisition, maintenance, use, and service of such communication tools are difficult challenges for the business to overcome.

For example, consider the difficulties encountered by a small-to-medium-sized business in the acquisition of basic communications tools such as telephone equipment, a fax machine, and e-mail or a Web site. For the telephone equipment, the business purchases connections to the telephone network from the local or other carrier and may negotiate a service contract with the carrier. The voice lines of the telephone equipment, of course, must be connected with a telephone switch to provide inbound/outbound access and intra-company voice communications. The business then may spend some time in making a decision on facts relating to the type, characteristics, and costs of the long distance service the business is to receive. One or more dedicated fax lines are purchased, as well as a fax machine, and related peripherals and software as appropriate. If the business deems it critical to have a Web site, the business hires a consultant to produce and maintain the site. The site must be "hosted" by a service provider, meaning another vendor to select, contact, negotiate with, pay, etc. Employees may require e-mail, Internet e-mail, and Web access, which tools may require yet another vendor or vendors and a high-speed connection with local-area network connectivity. The list of tasks for the business with respect to communications tools goes on, but these examples show the challenges facing the small-to-medium-sized business.

Given the difficulties in the acquisition of basic communications tools, the acquisition, maintenance, use, and service of advanced communications tools may be even more difficult. A small-to-medium-sized business or similar institution typically does not have the resources (personnel, financial, space, or time) to acquire, use, maintain, and service such additional communications tools. In contrast, large businesses may have the appropriate resources so as to avoid the resource problems faced by small-to-medium-sized businesses. These problems at least include: the large number and variety of available products for use in modern communication systems, the relative size and complexity of such systems, the difficulties in information gathering, procurement, installation, maintenance and service of such large, complex systems, and the high costs associated with such large, complex systems.

For example, a large business may have a dedicated in-house staff of communications and/or information professionals having a wide array of knowledge, experience, and skills on creating integrated communications systems designed to meet the needs of the business. But the small-to-medium-sized business often cannot afford an in-house staff nor hire the consultants that would be needed to acquire the communications tools that would help the business compete with other businesses.

Some of the problems associated with modern communications systems also may stem from the fact that many different technologies are necessary in the operation of such systems. For example, the following technologies may be necessary to process a given media stream: voice, fax, data, remote access services, and their accompanying and associated applications. A large business may commission a custom communications system to incorporate as many of the technologies as the large business decides it may need or use. A small-to-medium-sized business, on the other hand, generally does not have the financial (and other) resources necessary to obtain a custom communications system. The small-to-medium-sized business is left with the option of piecing together different technologies in the form of different products to achieve a modern communication system that is probably only minimally acceptable for the needs of the business.

The problem of the small-to-medium-sized business in piecing together a modern communications system from off-the-shelf parts is complicated by the nature of the communications business and suppliers of such off-the-shelf parts. Nearly every piece of communications equipment has one type of input, one function, and one type of output (viz., a fax terminal, data modem, or telephone switch). This uni-functionality comes about because the producers of such products may only have the expertise to develop and market one functional entity. End-users (including small-to-medium-sized businesses) are deprived of the benefit of integrated communications systems.

Thus, small-to-medium-sized businesses face the problem that each of these communications technologies or tools may be developed, produced, offered, and serviced by a respectively different company—typically one technology per company. A company generally confines itself to producing products in its area of technology. Nevertheless, there may be a large variety of products with differing features on similar technologies. The result may be a modern communications system including many different technologies with each technology handled by a product obtained from a respectively different company.

A suggested solution to the problems of different technologies being handled by products of respectively different companies is the use of a common platform wherein the different technologies may be integrated. However, even if a common platform including the media-processing resources and applications required for modern communications is provided, the small-to-medium-sized businesses and similar institutions are still faced with problems.

Remaining problems at least include the difficulties in procurement, installation, maintenance, and service of a modern communications system and the high costs associated with such systems. The typical small-to-medium-sized business does not have the personnel and other resources to overcome the problems. For example, unlike a large business, even a medium-sized business is unlikely to employ a full-time communications and/or information-technology staff. Such a dedicated staff may be necessary to address the issues with respect to information gathering, procurement, installation, maintenance, and service of a modern communications system. Moreover, the staff may be required to train and support the other employees of the business with respect to the communications tools.

Communications-equipment vendors generally are aware of the needs of the small-to-medium-sized businesses. The benefits of integrating the multitude of communications functions onto a common platform as a solution to these problems have been mentioned. But the efforts generally have not met with success for at least the following reasons:

The selection of applications/functions is limited because no single company typically has the competencies to develop all required communications applications/functions.

The resulting limited-function communications system is still unaffordable to most of the small-to-medium-sized businesses.

The resulting communication system of the common platform generally requires trained on-premises personnel to configure and maintain.

The resulting communication system of the common platform generally cannot be easily upgraded to support new applications/functions or upgraded applications/functions.

The resulting communication system of the common platform typically requires external enabling functionality, such as network connectivity, to become operational.

Therefore, except for telephone equipment and a relatively simple fax machine, small-to-medium-sized businesses typically attempt to operate without advanced communications tools. Without such advanced communications tools, the small-to-medium-sized businesses are encountering growing difficulties and disadvantages in the marketplace as the effective utilization of communications and information technology becomes a prerequisite to competition in the "New Economy" of the early twenty-first century.

Moreover, the communications and information-processing needs of the small-to-medium-sized businesses are shared by any size organization intent on providing a budget-constrained service, such as educational institutions, non-profit organizations, governmental entities, and medical service providers. All have the same needs: they must communicate with the people involved with the organization to improve the effectiveness of value delivery.

Accordingly, there is a need for a system and method that allows individuals and organizations to access and make use of advanced communications tools and communications services in an easy and efficient manner so as to avoid having to separately obtain, install, maintain and train on the tools and services from different vendors and service providers.

SUMMARY OF THE INVENTION

Systems and methods are disclosed that allow a user to access communications services using a computer suitably connected to a communications-applications support system at a service provider's facility. The user's computer is provided with information as to the communications services available. These services may be ordered for implementation on and use with the user's computer or on the computer used in connection with the support system. The implementation and performance of the communications services on the computer may be monitored, and if substandard, then remedial action may be taken by the system. Also, maintenance, upgrades and new services may be transferred from the system to the user's computer as appropriate. Advantageously, the user is relieved from provisioning, configuring, maintaining, updating, or educating individuals about these communications services.

According to an aspect of the present inventions, a user may choose from a plurality of communications functions or services to be configured on its service node for the provision of communications services to the user. In addition, the user may add and/or remove communication services. Advantageously, the user only has to choose a desired service. The details of adding, deleting, modifying, and/or upgrading a specific application software program are handled by the service provider on the server. The user registers for specific communications services, and individuals associated with the organization may then be individually authorized to gain access to one or more of the enabled communications services.

A computer site for providing the server for the present inventions may include at least one Web Server computer designed for serving a plurality of Web browsers and providing the browsers with the capability of ordering communications services and specifying those services authorized for each user. The Web Server may work in conjunction with a separate database computer that may maintain the private database for each user. The database may maintain user statistics that are used to provision the appropriate resources for each user and to determine the charge to be applied to each user at the end of a billing period. Additional computers may be used to host the communications services offered to each user organization.

The service node, which is typically placed on the user's premises or under the user's control, includes an integrated communications application platform that provides the interconnection to the external network and connection points for on-premises computers and telephones via local-area network (LAN) connections on the user's premises. The service node includes a hard-disk drive to cache information locally for ultimate transmission to the remote server as throughput capacities allow.

The present inventions also provide for provisioning the service node to provide telephone services via the user's local area network (LAN), rather than through switched-circuit telephone connections such as generally used over the public telephone network. This allows the user's previously installed LAN wiring to be used for voice communications, in conjunction with IP telephones (Internet telephones—and also referred to as Internet Protocol telephones).

Should the user have an existing LAN and LAN server, the service node may be included as an additional server on that network. Should there be no existing LAN, the service node is capable of providing that function, eliminating the cost of a separate LAN server and adding the benefit of outsourced server backup.

An exemplary embodiment of the present inventions includes an integrated service node, located on the user's premises, that hosts most communications and many information—technology functions, such as voice-call routing, messaging, and connectivity. The service node is suitably connected, preferably through the Internet, to a central (off premises) array of computer systems, including the service provider's server. The server provides those computational resources that may be necessary for a solution of the user's communications needs that are unavailable on the service node alone. The server is also the source of application software (communication functions) downloads to the service node, maintenance, and billing functions necessary to support the service delivery on an on-going basis.

The service node enables centralized provisioning and system management from the server because the service node consolidates communications functions preferably onto one compact platform connected to the server via the Internet. Since all functionality is software-based, the communications services can be provisioned from the server. Rather than requiring that the user purchase a communications feature from a different vendor each time the user desires to add a major function to its communications system, such as a fax server or a telephone system, the present inventions allow the communications service to be ordered by the user from the user's computer (service node) through the use of a Web browser as a utility, just as gas or water is ordered today.

An advantageous aspect of the service node is its open integrating software environments that make it possible to turn what was once hardware into software. One software environment allows software-based media-processing technologies, such as voice, fax, and data, from multiple vendors, to be easily integrated onto the service node, allowing these functions to be added to the service node via software download from the server, rather than through the addition of hardware. The second software environment allows software applications, such a PBX, fax services, or Web services, from multiple vendors to be added to the system by software download from the server, rather than the purchase of a new separate hardware system.

BRIEF DESCRIPTION OF THE DRAWINGS

The foregoing and other aspects and advantages will be better understood from the following detailed description of an exemplary embodiment of the inventions with reference to the drawings, in which.

DETAILED DESCRIPTION

Exemplary methods and systems are described that relate to the provision of communications services to a user. Per the exemplary methods and systems, a user may access communication functions to obtain communication services using a computer or other device suitably connected to a communications application support system (CASS) located at a service provider's remote facility or elsewhere. Preferably, this connection uses a communications network such as the Internet or other communications network to effect the connection between the computer of the user and the CASS of the service provider. The communications services may be provided as applications outsourced from the user to the service provider. The present inventions generally allow for the provision of communications services to the user such as those usually provided by a private branch exchange (PBX) or a facsimile service. Advantageously, the present inventions relieve the user from having to provision, configure, and/or maintain complex, local communications systems.

Figure 1:
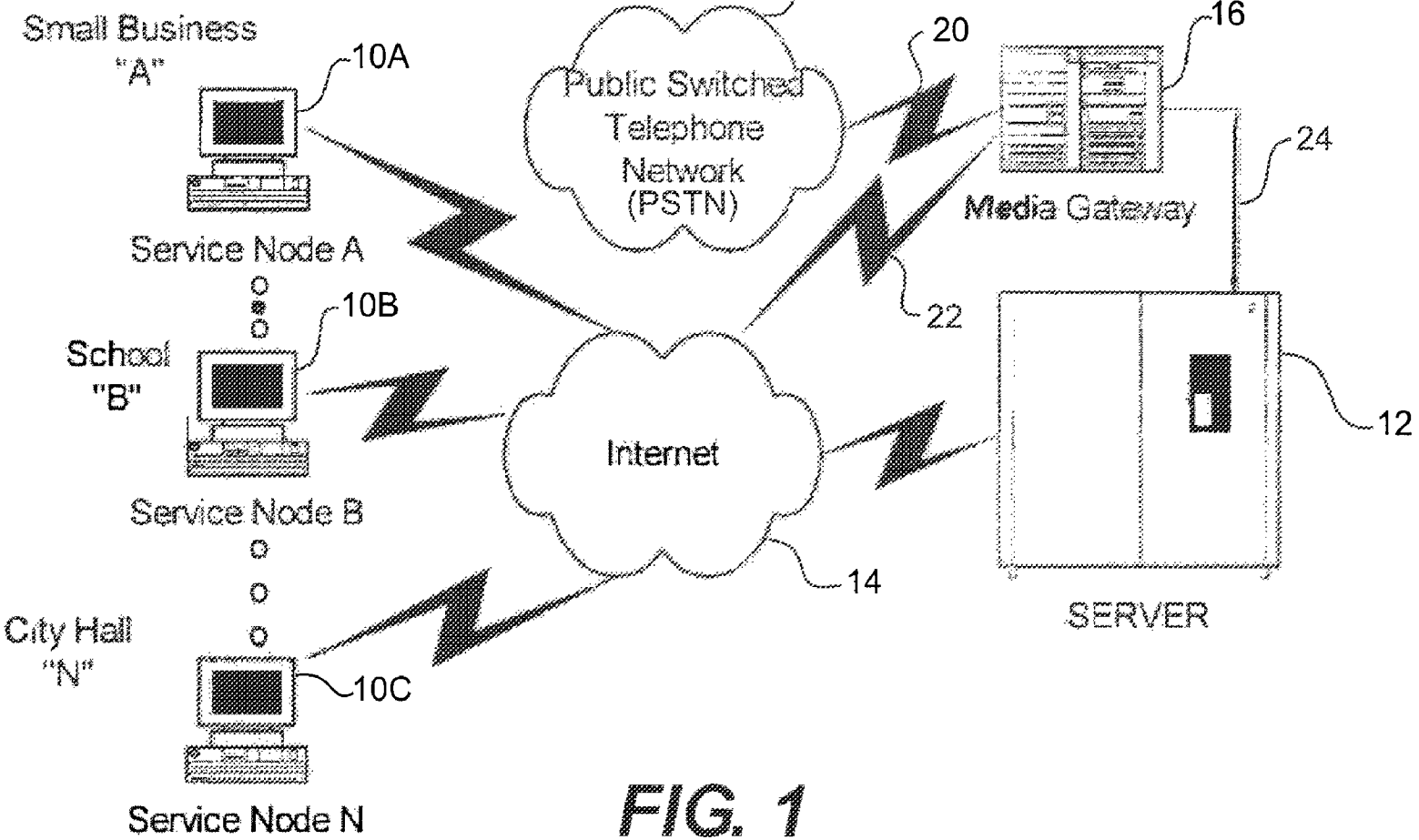
FIG. 1 depicts an exemplary system architecture.

Exemplary Environment—FIG. 1

The exemplary embodiments of the present inventions provide the following exemplary elements for use in the methods and systems of the present inventions as illustrated and described below in connection with FIG. 1. A computer 10A, 10B, or 10C or other intelligent device such as an integrated-media integrated-applications communications server (referred to herein as the service node or computer) is placed typically on the user's premises or under the user's control (or part of another device found typically on the user's premises or under the user's control) that consolidates the functions and/or services formerly provided by physically separate communications products or systems such as a private branch exchange (PBX), facsimile (fax) server, or remote-access server, and that turns them into software-based functions or services. Additional details regarding an exemplary service node are provided below in connection with FIG. 3.

A server 12, located on the service provider's premises (or under the service provider's control), provides for the hosting of system management and applications. The hosting may require computing resources that exceed those available from the service node 10A, 10B, 10C. The server 12 also may be referred to herein as the communications application support system (CASS). The server 12 may be an independent unit, may be a set of functions, applications, etc. distributed through a single unit (with other functions) or across multiple units, or may be a part of a server complex. The service node 10A, 10B, 10C and the server 12 are connected via the Internet 14 or other suitable communications transport. Additional details regarding an exemplary server 12 are provided below in connection with FIG. 4.

A media gateway 16 connects the server 12 of the service provider's network with the public switched telephone network (PSTN) 18 (or other networks as appropriate). The media gateway 16 transcodes the circuit-switched voice transport to and from the packet-switched transport suitable for transport of voice conversations over the Internet 14. The media gateway 16 is typically controlled by the server 12, which may include a "media gateway controller" functionality.

As shown in the exemplary system illustrated in FIG. 1, the service provider's server 12 and the user's service node 10A, 10B, 10C are connected via the Internet 14 or other suitable transport. The media gateway 16, which may be located in the provider's server facility or virtually anywhere in the network, provides media-transformation services between the existing circuit-switched public telephone network 18 and the packet-based format used by the Internet 14 and other suitable networks. The media gateway 16 is controlled through programming by the service provider's server 12, serving as a media gateway controller.

The media gateway 16 may be a communications system, and generally may be a part of the public communications network. The media gateway 16 includes suitable circuits for terminating the circuit-switched time-division-multiplexed voice calls of the current voice network. It may include multiple digital signal processors (DSPs) used to perform the media-translation functions between dissimilar networks under the direction of the media gateway controller. And, finally, the media gateway 16 may include suitable circuits to interface with the Internet via a high-speed data connection(s). An example of a media gateway is the Softswitch from Lucent Technologies and the VocalTec Telephony Gateway Series 2000 by VocalTec Communications, Inc., Fort Lee, N.J.

Figure 2:
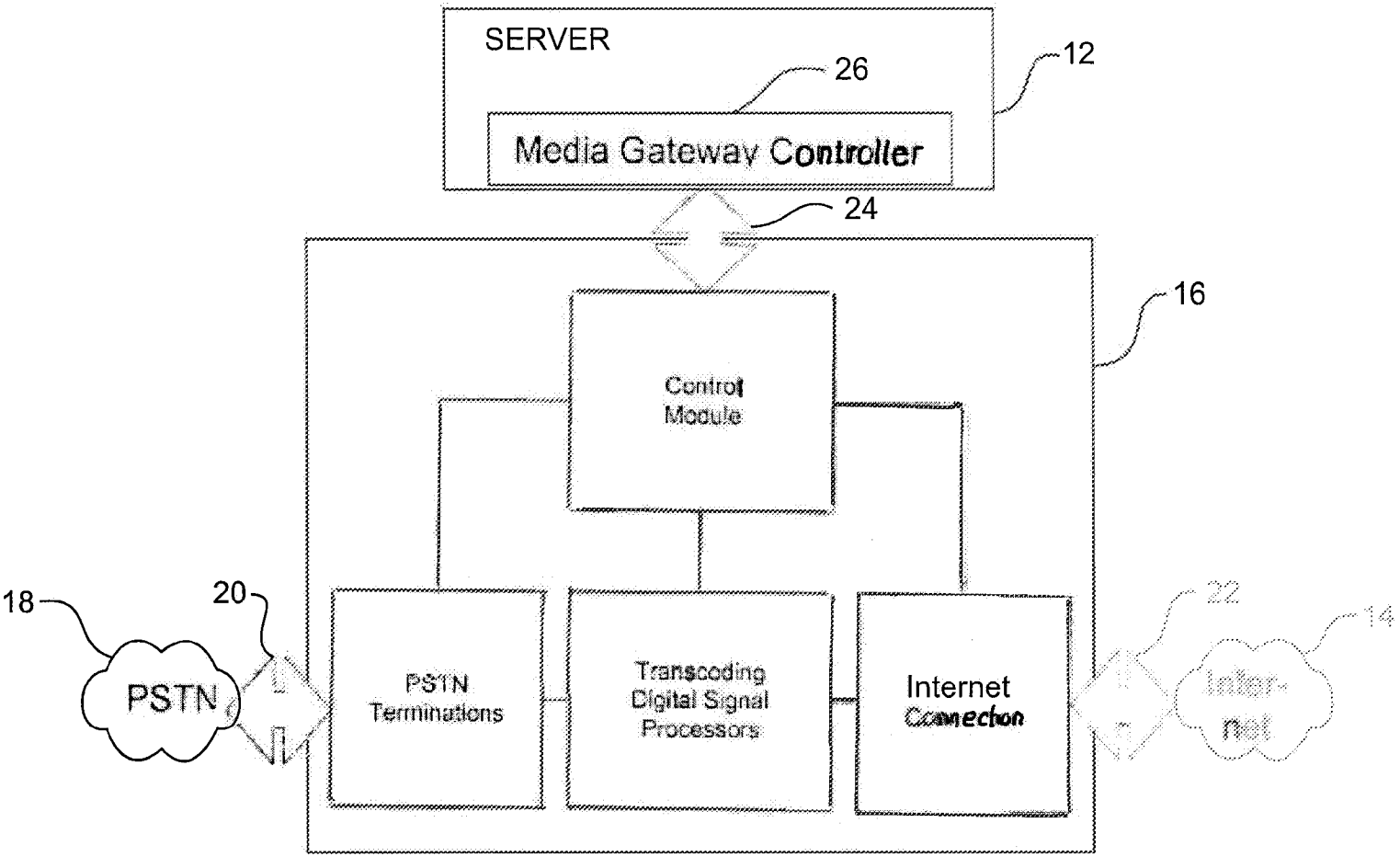
FIG. 2 is a block diagram of an exemplary media gateway.

Exemplary Media Gateway—FIG. 2

As shown in the exemplary system illustrated in FIG. 1, the exemplary media gateway 16 has three primary connections 20, 22, and 24. Additional details regarding the exemplary media gateway 16 are provided by the illustration of an exemplary media gateway in FIG. 2. As illustrated in FIG. 2, a first primary connection 20 of the media gateway 16 connects the media gateway 16 with the public switched telephone network (PSTN) 18 using a suitable high-speed voice connection (or other suitable means). A second primary connection 22 of the media gateway 16 connects the media gateway 16 with the Internet 14 using a suitable high-speed data connection (or other suitable means). A third primary connection 24 of the media gateway 16 connects the media gateway 16 with the server 12, which may be a separate computer within a server complex. The third primary connection 24 allows the server 12 to provide commands and receive responses that enable the server 12 to serve as a media gateway controller 26. The third connection 24 may be by any suitable means, but will typically be via the Internet.

Telephone, fax, or data calls, for example, originating from other networks and received by the media gateway 16 are translated by the media gateway 16 and are caused to be routed to the correct destination within the provider's network, using generally user-based call routing as opposed to location-based. For example, an individual located on the premises of Small Business A in FIG. 1 has calls routed to a suitable destination. The service node 10A on the user's premises contains within its local storage routing instructions that cause the call, a voice call, for example, to be routed to an individual's telephone. Should the individual leave the premises, he or she may so inform the service node 10A, causing inbound calls for the individual to be routed by the service node 10A to a pre-designated wireless communications device, for example. Fax calls, video conference calls, and data messages are also suitably routed. At the user's option, the dynamic call routing described here may be extended to the residential (or other) voice or other services serving the employees, colleagues, or others associated with the user. Similarly, the call-routing facilities of the exemplary system may be extended to the customers or clients of the Small Business A. Even though the exemplary embodiments described herein use a media gateway 16, the functions provided by the exemplary media gateway 16 may be incorporated into another device, divided among other devices, and/or included in the service node or the server.

An exemplary embodiment of the present inventions may be set up to accommodate a single user or customer such as the user referenced in FIG. 1 as Small Business A. But the present inventions are not limited to a one-to-one arrangement between the server 12 operated typically by a service provider and a service node. Advantageously, the exemplary embodiments allow a single server 12 to serve more than one user or customer. Thus, FIG. 1 illustrates a plurality of users with each user having a service node 10A, 10B, 10C that is connected to the server. The server 12 in FIG. 1 serves the Service Node A 10A of Small Business A, the Service Node B 10B of School B, and the Service Node N 10C of City Hall N. The number of service nodes (or other devices) served by the service node of a service provider in connection with the present inventions is not necessarily set at a limited number, but such number depends on the features and capacities of the server and on the features and capacities of each of the service nodes connected to the server.

FIG. 1 illustrates three types of users (a small business, a school or other educational institution, and a city hall or other governmental institution) that may take advantage of the present inventions. But users are not limited to these three types. Other types of users may include: one or more branch offices of the multiple branch offices of large corporations; service organizations; individuals (at home and/or the office, or other place) such as a stay-at-home parent with a single personal computer (PC) and a single Internet telephone; medical institutions; financial institutions and other institutions.

Advantageously, each of these types of users may be provided with respectively different communications services through the use of the present inventions. In other words, a user may configure its own set of communications services that are provided by the server 12 through a service node 10A, 10B, 10C. For example, the City Hall C may have access to communications services that would allow City Hall to broadcast local emergency announcements in many technologies to the citizens of the community, and that would allow City Hall to broadcast public service announcements in a different manner from emergency announcements to the citizens of the community.

FIG. 1 may be understood to represent that each of the three users is located in a different geographic place. But that is not necessarily the case. More than one user may be located at a single geographic location. For example, a high-rise office building may include many business tenants. Each of the tenants may make use of the advantages of the present inventions by including a service node with an Internet connection to a service provider's server such as illustrated in FIG. 1. In addition, some users may be so situated that their respective service nodes are located in the same place, but each service node serves a particular user. In some cases, two or more users may use a single service node with the appropriate distinctions made in the service node to differentiate the respective users.

The description so far has referred generally to a "user" such as a small business, a school, city hall, etc. Of course, each of these users may have one or more individuals who may make use of communications services. Advantageously, the concept of user-based rather than location-based call routing may be extended for use in connection with the present inventions to encompass and serve the individuals associated with a user as an affinity group. For example, School B, in FIG. 1, includes students (and perhaps their respective parents or guardians) as an affinity group of the School B. Information for each student or individual of the affinity group may be accumulated, maintained, and used as necessary to facilitate the use of communications services by and for the individuals of the affinity group through the present invention.

A user may include more than one affinity group. The access to and use of communications services provided through the present inventions may differ from affinity group to affinity group of a user. For example, Small Business A, in FIG. 1, may include a first affinity group that includes customers. Small Business A also may include a second affinity group that includes employees of the Small Business A. The customer affinity group may have access to communications services that allow a customer to communicate with the customer service department of the small business A by telephone, by voice mail, by fax, by e-mail, etc, but only between the customer and the Small Business A. The employee affinity group may have access to a much broader range of communications services such as international telephone and fax service, etc.

Example of Installation Actions With Respect to a Service Node

Advantageously, it is relatively simple for a user to set up and make use of the present inventions. There are typically eight actions to be executed for the user to obtain communications services from a service provider pursuant to the present invention. Installation of on-premises wiring, if any, is required to connect individual desktop computer(s) of the user (and its respective individuals) with the service node 10A, 10B, 10C that may be located on the user's premises or under the user's control. If the user's computers are local area network (LAN) connected computers (PCs), this step may be skipped because generally the existing wiring may be used.

User workstations/computers (PCs) are installed, if necessary.

If Internet telephones are to be used by the user and the user does not as yet have Internet telephones, then such Internet phones may be installed, as necessary, using the same LAN wiring and hardware as used for the user's PCs.

The network connection is provisioned as necessary. The suggested mode of network connection for the small-to-medium-sized-business is an integrated-media digital subscriber line (DSL). However, other means of network connection may be more effective in specific situations.

The service node is installed on the user's premises (or under the user's control) by connecting the service node to the LAN wiring and the network connection.

After being powered-on, the service node loads its factory-installed software from its fixed-disk drive and the initialization software is launched as a system service. The service node 10A, 10B, 10C contacts the server 12 via the network connection. Typically, the installed software is software to make the service node 10A, 10B, 10C operational and receptive to interaction with the user and with the service node 10A, 10B, 10C. The installed software may include communications functions that have been selected by the user (at the time of ordering or purchase) or that may be included as a basic package in the service node 10A, 10B, 10C by direction of the service provider. Additional or different communications functions may be obtained for installation in the service node 10A, 10B, 10C so as to make additional or different communications services available to the user. These additional or different communications functions may be ordered by the user through use of the service node 10A, 10B, 10C and then provided to the service node 10A, 10B, 10C by the server 12 as explained below in the operations section of this description.

The service node 10A, 10B, 10C may be authenticated such as by transferring a factory-installed certificate that identifies the service node 10A, 10B, 10C as associated with the user to the server 12. The user also may be authenticated by being prompted to input a matching user (client) password or other personal or business identification number (PIN) or identification device. (Individuals of a user may be similarly authenticated.)

The server 12 downloads the operational software (communication functions) needed to support an initial (or ordered) slate of communication services to the service node 10A, 10B, 10C and the system is ready to provide the provisioned services. Since the operational software is provided from the server 12, the user is relieved of the responsibility of upgrading the system as technology advances.

A Web browser or other mechanism may be used to cause the appropriate operational software to be downloaded to each workstation or computers of the individuals associated with the user.

As above, the server 12 provides the service node 10A, 10B, 10C with the operational software (communication functions) so that the user may make use of the communications services enabled by the operational software from the user's computer. Advantageously, a user may choose from among many different communications services for use through the user's computer. Such different communications services may include telephone service, facsimile service, data transport service, IP telephone service, call processing service, integrated messaging service between voice, fax, and data, connection service to global communication networks such as the Internet and other external networks, service to provide a presence on the Internet such as a Web site or other presence on the World Wide Web, electronic commerce services, information-sharing services (extranets), knowledge management services, file and print services, remote access for telecommuting and other reasons, connections to intranets, extranets, and local area networks, cache services for information as necessary, and similar or other communication services.

When the user initially decides to make use of the present inventions, a customer service representative of the service provider may provide the user with information as to the available communications services, or the user may obtain the information in another manner such as by consulting a Web site of the service provider. The user may provide the service provider with the user's choices of an initial slate of communication services, (or may select a basic set of services pre-configured by the service provider). As above, the server 12 provides the service node 10A, 10B, 10C with the operational software so that the user may make use of the communications services enabled by the operational and/or functional software from the user's computer. To facilitate use of the communications services, each communications service may include an on-line tutorial that can be invoked at any time by the user.

Available communications services may be accessed by the user through the service node 10A, 10B, 10C. For example, the available communications services may be stored and then accessed from a pull-down menu or the like through the use of the user's computer. The pull-down menu may include a graphical icon-oriented display for the available communications services. This display may lead the user to additional information regarding a selected communications service. The additional information may include cost of the communications service, availability, and other features of the service. The communications services that are already enabled for the user may be indicated on the display in some way to distinguish them from the communications services the user does not have enabled.

Another advantage of the present inventions is that a user may change the slate of communication services through the use of the connectivity between the service node 10A, 10B, 10C and the server 12. The user may add a communication service(s) to the services that are enabled, or the user may delete a communication service(s) that is enabled. The pull-down menu or similar manner of listing the communication services for review by the user may provide the user with an indication of what is available from the service node 10A, 10B, 10C, what the user already has enabled, etc. The user may provide an indication to add or delete a communication service through use of the pull down menu or through some other manner including the use of the computer.

Once the user indicates a change to the slate of services, the service node 10A, 10B, 10C communicates the information to the server. The server 12, in turn, takes the appropriate action. For example, if the user has selected to add a communications service, then the server 12 provides the service node 10A, 10B, 10C with the operational software (communication functions) necessary to enable the selected service on the user's computer. As another example, if the user has decided to remove a communications service from the slate of services, then the service node 10A, 10B, 10C provides this information to the server 12. The server 12, in turn, may provide instructions to the service node 10A, 10B, 10C to remove the communications service. Such removal of the service may occur by removing the communications service from the service node 10A, 10B, 10C or in other manners.

As noted above, an advantage of the present inventions is that the user may access detailed information regarding the communications services that are provided (or could be provided) from the server 12 and through the service node 10A, 10B, 10C to the user. The information may include a tutorial about the available communications services. The tutorials may be available at different levels of detail so individuals of the user may choose a tutorial applicable to their level of familiarity with the communications service. Additional information regarding a communications service that is enabled on the service node 10A, 10B, 10C of a user may include information related to the service such as the cost of the service, the amount of use of the service, a list or other indication of the individuals associated with the user who have been using the service and by how much, a list or other indication as to the recipients of the communications enabled by the selected communication service enabled on the service node 10A, 10B, 10C of the user, and other information.

Advantageously, the service provider may provide announcements to the user such as the announcement of new communications services that are available to the user, the upgrade of a service already enabled for the user, and other announcements. These announcements may be provided as electronic mail messages or other messages from the server to the service node 10A, 10B, 10C.

As noted, one of the advantages of the present inventions is that the user generally is relieved of the problems associated with the acquisition, maintenance, upgrades, and usage education related to communications services provided through the service provider. The service provider maintains, services, updates, and provides education about the use of the communications services that are made available and/or enabled to users. To perform such maintenance, service, upgrades, or education, the server 12 conveniently, efficiently, and economically uses its connection with the service node 10A, 10B, 10C as appropriate.

Figure 3:
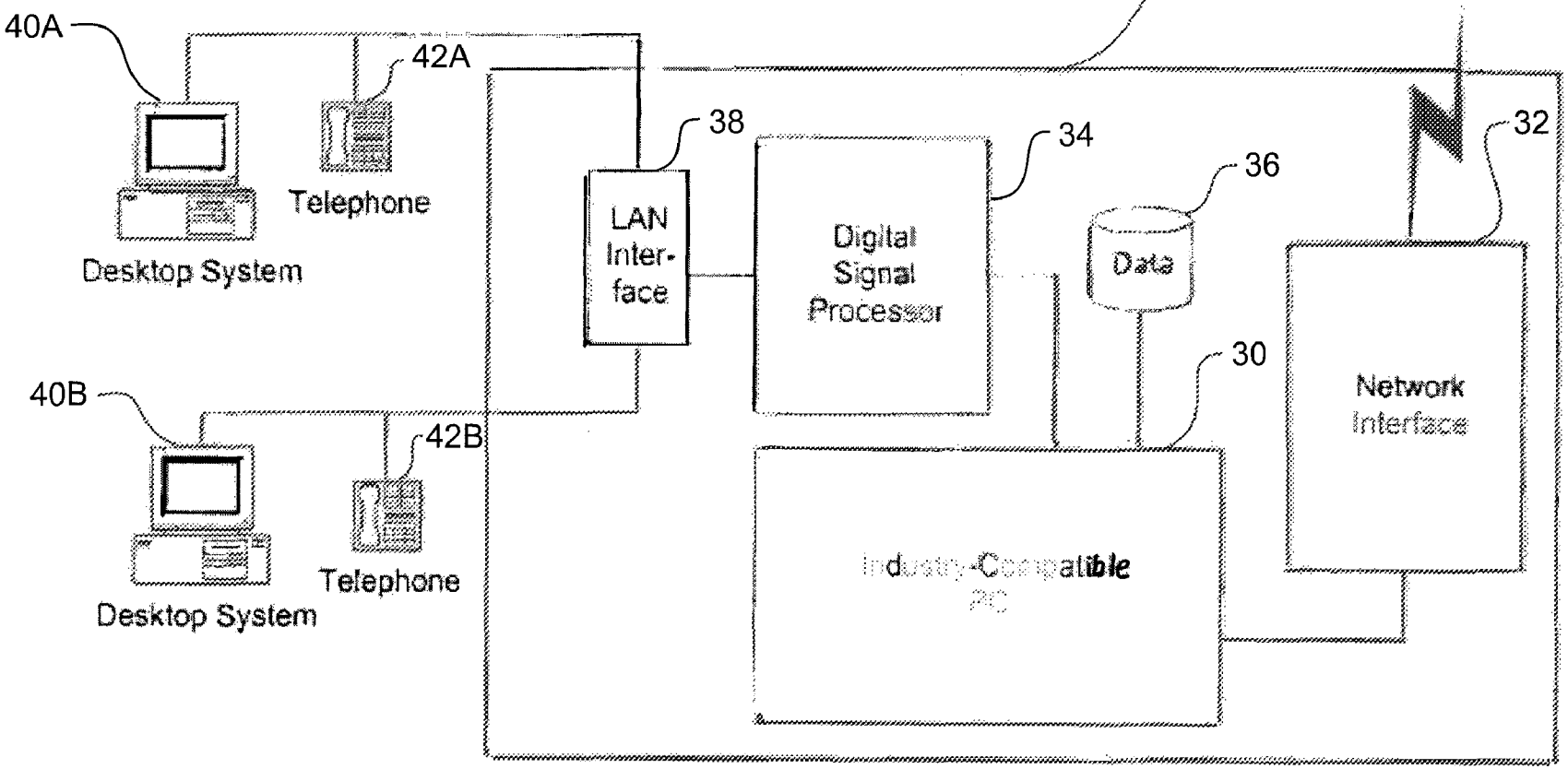
FIG. 3 is a block diagram of an exemplary service node.

Exemplary Service Node—FIG. 3

A service node 28, such as may be used with the present inventions, typically includes a computer 30 (such as a special purpose or industry-compatible personal computer (PC)), and a communications server 32, which provides the network-interface hardware to connect the user with the server 12 of the service provider. This single connection, in the exemplary embodiments, transports all media that may be associated or necessary to the provision of a communications service to the user, and may include the transport of voice, data, fax, and video. Multiple alternate connections and connection types may be configured on the service node 28, if the connectivity described above cannot be provisioned.

The service node 28 may include an "industry standard" personal computer (PC) 30, for use in the general computational needs of the service node 28, integrated on a single circuit board with a digital signal processor (DSP) 34. The DSP 34 is a specialized processor utilized to process the media streams delivered by the network connection by executing software programs. Each of these software programs or applications may be designed by and/or obtained from a different organization (vendor) so as to obtain different types of functionalities for use with the service node 28 rather than a single or uni-functionality product obtained from a single organization. The referenced media processing converts the streams of media (or information) from the form used for transport over the network to the form for local processing by the service node 28, and the reverse for the opposite direction. The service node 28 may also include typical elements of a computer system, such as a data storage 36, hard-disk drive (not illustrated), printer interfaces (not illustrated), and local-network (LAN) interfaces 3.8.

The LAN interface 38 is used to provide connectivity to computers 40A, 40B of the individuals of the user and to the telephones 42A, 42B that utilize packet technologies (Internet or Internet Protocol (IP) telephones) to transport voice rather than the circuit-switched technology that is common in voice-communications systems. The use of IP telephones through the service node 28 is an advantage of the present inventions in that it allows a user to eliminate the costly hardware required by circuit-switched systems. Each IP telephone 42A, 42B, each with its own Internet address, can be reached over low-cost Internet or IP infrastructure that is scaleable without the need to add hardware.

Advantageously, the service node 28 also may include the resources necessary to operate autonomously, that is, independently without interaction with the server 12. Thus, the service node 28 may maintain communications service to the user, but typically with reduced capacity, even though the remote server 12 may become unavailable. Moreover, those communications services may include classical information-technology functions, such as file and print services for users connected via the organization's LAN.

The service node 28 includes a software environment in its functional design that has several advantages over previous high-function communications systems. Optimally, the service node 28 may run a low-cost commercially or freely available operating system. In contrast, many high-function communication systems utilize special-purpose or custom operating systems. Second, the service node 28 may be designed based on an open-architecture software system that supports the integration of DSP-based media-processing software, each software application being possibly independently developed by respective multiple vendors. Third, the service node 28 may include an open-architecture software system that supports the integration of multiple applications from respective multiple vendors on the service node's single processor.

The service node 28 may use high-speed data, automatic speech recognition (ASR), text-to-speech (TTS) conversion, and voice and fax over the Internet (VoIP and FoIP) as media-processing technologies. Each of these functions uses DSP-based technology that is produced by highly skilled and specialized development resources and years of field-testing and refinement. Therefore, sources of these technologies may be typically specialized companies.

The advent of ultra-powerful DSPs opens up the possibility of integrating media-processing technologies into one common hardware resource, avoiding the cost of purchasing and integrating multiple fixed-function media-processing resources. But this creates the question of how to marshal the technological competencies of the different media-specific vendors onto one common hardware resource, the service node. The typical approach to creating integrated-media is to integrate the disparate media technologies into a closed-architecture environment. The result is functional equivalency, but at a cost that rules out utilization by the small enterprise.

Advantageously, the service node 28 provides an open software environment that supports portability of media-processing software (algorithms) between different environments. This means any vendor that develops a media-processing technology product that conforms to the service node's open-media specification is able to offer that product for use within the service node 28 (or any other product that supports that specification). The service node 28 allows for functional integration at the application level.

The service node 28 may include a software environment that allows the application developer to independently develop and integrate application-level products that interoperate with those of other application vendors. For example a call-processing and messaging application can hand off a call to a LAN-based fax server, all operating on the service node 28, and all developed by different organizations, effectively marshaling the resources of a large cross section of the communications industry.

The service node's integrating application environment, in combination with its integrating media-processing environment, gives the user of the service node 28 the ability to select a combination of the best applications using the best media-processing technologies developed by a potentially unlimited number of independent developers.

The service node 28 may periodically run diagnostics on all subsystems. The service node 28 may report the results of these tests and usage statistics to the server 12. These statistics may be analyzed by the server 12 to prepare billing statements, offer new services to the user, and/or to order remedial service for the communication functions and/or services on the service node 28, if required, and to carry out similar actions based on the information received from the service node 28.

Figure 4:
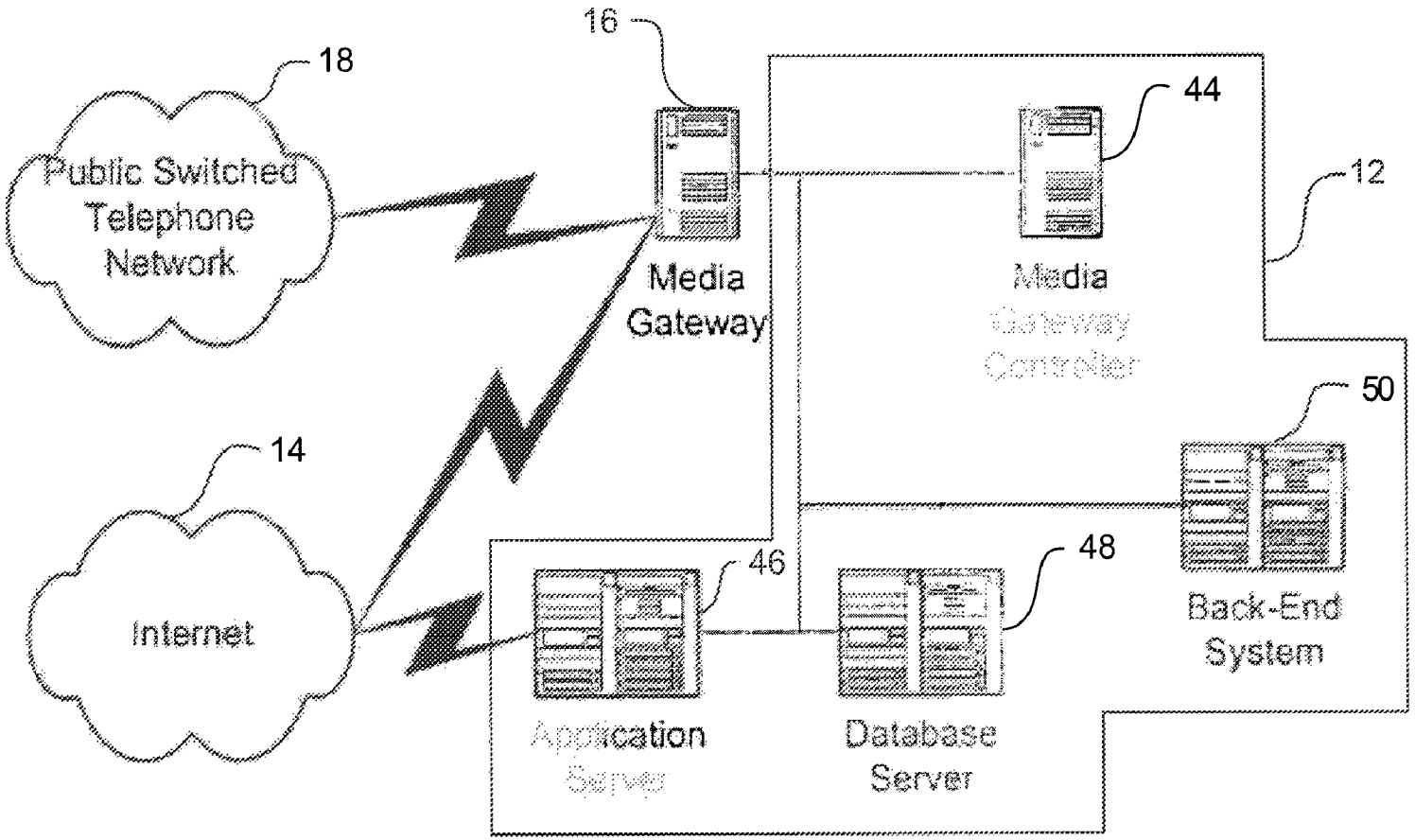
FIG. 4 is a block diagram of an exemplary server.

Exemplary Server—FIG. 4

The server 12 may be a single computer or may be multiple computers or a server complex that may be used to maintain and to use various types of information such as the service profile of each user and of individuals associated with a user, call-detail records for billing and other purposes, the software, communication functions, service applications that have been provided for each service node, and similar information. In addition, the functions of the server 12 may include the routing of calls, the execution of software applications on behalf of users, and providing routine and remedial maintenance of the service nodes and the communication services offered by such service nodes. The exemplary server 12 illustrated in FIG. 4 includes a media gateway controller 44 for use in interfacing with the media gateway 16, an application server 46 including the software applications related to the communications services of the system, a database server 48 to interface with and store data related to the communications services and users or customers, and a back-end system 50 for other and duplicative functions of the server 12.

A computer site for providing the server functionality for the present invention may be provided. Such a site may include at least one Web server computer designed for serving a plurality of Web browsers. The Web server allows the browsers to set up, add, and/or delete communications services that are provided to the users through their respective service nodes. The server 12 specifies those services authorized for each user. The Web server may operate in conjunction with a separate database computer that may maintain a private database for each user. The database includes information such as user statistics that may be used to provision the appropriate resources for each user and to determine the charge to be applied to each user at the end of a billing period. As shown in FIG. 4, an additional or other computer(s) may be used to host the communications functions, software and applications offered to each user to enable communications services. The additional or other computer(s) may also include Web hosting facilities.

The partitioning of the functions of the server 12 across computing platforms is not critical to the present inventions. The server 12 may be hosted by a few or one powerful computer or, alternatively, it can be composed of or distributed across a number of computers, each providing a function. Moreover, the server generally is implemented using a redundant design and configuration in order to achieve a high and assured service level.

CONCLUSION

The exemplary embodiments of the present invention were chosen and described above in order to explain the principles of the inventions and their practical applications so as to enable others skilled in the art to utilize the inventions including various embodiments and various modifications as are suited to the particular use contemplated. The examples provided herein in the written descriptions or in the drawings are not intended as limitations of the present invention. Other embodiments will suggest themselves to those skilled in the art. Therefore, the scope of the present invention is to be limited only by the claims below.

I claim:

1. A method [to allow] *for providing* a customer [to readily obtain] selected communications functions or selected communications services [from a single source so as to save the customer from having to procure the selected functions or the selected services from different sources and save the customer from having the problems associated therewith], the method comprising:

*receiving an electronic certificate identifying a computer of the customer;*

*authenticating the received certificate;*

[providing a] *transmitting to the* computer of the customer [with] information regarding communications services or communications functions available to the customer;

receiving an order for a selected communications function or for a selected communications service from the computer;

in response to receiving the order for the selected communications function, executing the selected communications function, and maintaining function data on the customer and the selected communications function; and in response to receiving the order for the selected communications service, causing the selected communications service to be implemented at the computer, and maintaining data on the customer and the selected communications service implemented at the computer.

2. The method of claim 1, wherein the information comprises information on telephone service, internet phone service, facsimile, paging service, data messaging service, integrated message service, intranet messaging service, extranet messaging service, remote access service, central office, private branch exchange (PBX) service, automatic call distributor (ACD) service, or personal locator call service.

3. The method of claim 1, further comprising:

receiving from the computer a deletion order for deletion of one of the selected communications services from the computer; and in response to receiving the deletion order, causing deletion of *the one of* the selected communications services from the computer.

4. A method [to allow] *for providing* a customer [to readily obtain] selected communications functions or selected communications services [from a single source so as to save the customer from having to procure the selected functions or the selected services from different sources and save the customer from having the problems associated therewith], the method comprising:

[providing] *transmitting to* a computer of the customer [with] information regarding communications services or communications functions available to the customer;

receiving an order for a selected communications function or for a selected communications service from the computer;

in response to receiving the order for the selected communications function, executing the selected communications function, and maintaining function data on the customer and the selected communications function; and in response to receiving the order for the selected communications service, causing the selected communications service to be implemented at the computer, maintaining data on the customer and the selected communications service implemented at the computer, monitoring implementation of the selected communications [services] *service* at the computer, and

[if] *in response to a determination* the implementation is substandard, [then] taking remedial action with respect to the implementation.

5. A method [to allow] *for providing* a customer [to readily obtain] selected communications functions or selected communications services [from a single source so as to save the customer from having to procure the selected functions or the selected services from different sources and save the customer from having the problems associated therewith], the method comprising:

[providing] *transmitting to* a computer of the customer [with] information regarding communications services or communications functions available to the customer;

receiving an order for a selected communications function or for a selected communications service from the computer;

in response to receiving the order for the selected communications function, executing the selected communications function, and maintaining function data on the customer and the selected communications function; and in response to receiving the order for the selected communications service, causing the selected communications service to be implemented at the computer, maintaining data on the customer and the selected communications service implemented at the computer, monitoring functionality of the selected communications [services] *service* at the computer, and

[if] *in response to a determination* the functionality is substandard, [then] taking remedial action with respect to the implementation of the selected communications [services] *service* at the computer.

6. A method [to allow] *for providing* a customer [to readily obtain] selected communications functions or selected communications services [from a single source so as to save the customer from having to procure the selected functions or the selected services from different sources and save the customer from having the problems associated therewith], the method comprising:

[providing] *transmitting to* a computer of the customer [with] information regarding communications services or communications functions available to the customer;

receiving an order for a selected communications function or for a selected communications service from the computer;

in response to receiving the order for the selected communications function, executing the selected communications function, and maintaining function data on the customer and the selected communications function;

in response to receiving the order for the selected communications service, causing the selected communications service to be implemented at the computer, and maintaining data on the customer and the selected communications service implemented at the computer;

receiving an upgrade to one of the selected communications services implemented at the computer; [and]

causing the upgrade to the one of the selected communications services to be implemented at the computer*;*

*monitoring implementation of the selected communications service, including the upgrade, at the computer, and*

*in response to a determination the implementation is substandard, taking remedial action with respect to the implementation.*

7. A method for providing communications services by a service provider to a user, comprising:

provisioning a computer for use by [a] *the* user on a network and functionally connected over the network to a server of the service provider, and causing the computer to be operative

*for transmitting a certificate identifying the computer to the server,* for ordering *a* communications [services] *service* from the server, for receiving the communications [services] *service* from the server, for installing the communications [services] *service* received from the server so the communications [services are] *service is* available for use on the computer, for executing the [communication services] *communications service* with or without interaction with the server, and for displaying information relating to [the installed communication] *communications* services *installed on*

*the computer*, and relating to other communications services available from the server; *and* provisioning the server as a communications applications support system (CASS) as functionally connected to the computer through the network, and causing the server to be operative

*to authenticate the certificate received from the computer,* to respond to an order from the computer for a communications service by causing the communications service to be provided to the computer, [and]

to be accessible to the computer for execution of the [communication services] *communications service* with interaction with the server, and to provide the computer with information relating to the [communication services] *communications services* installed on the computer, and to the other communications services available *from the server*.

8. The method of claim 7, wherein the information comprises information on telephone service, internet phone service, facsimile, paging service, data messaging service, integrated message service, intranet messaging service, extranet messaging service, remote access service, central office, private branch exchange (PBX) service, automatic call distributor (ACD) service, or personal locator call service.

9. The method of claim 7, wherein [the action of] *said* provisioning the server comprises causing the server to be operative to receive a deletion order for deletion of one of the communications services from the computer; and in response to receiving the deletion order, to cause deletion of *said one of* the communications services from the computer.

10. A method for providing communications services by a service provider to a user, comprising:

provisioning a computer for use by [a] *the* user on a network and functionally connected over the network to a server of the service provider, and causing the computer to be operative for ordering *a* communications [services] *service* from the server, for receiving the communications [services] *service* from the server, for installing the communications [services] *service* received from the server so the communications [services are] *service is* available for use on the computer, for executing the [communication services] *communications service* with or without interaction with the server, and for displaying information relating to the [installed communication services] *communications service installed on the computer*, and relating to other communications services available from the server; *and* provisioning the server as a communications applications support system (CASS) as functionally connected to the computer through the network, and causing the server to be operative to respond to an order from the computer for a communications service by causing the communications service to be provided to the computer, to be accessible to the computer for execution of the [communication services] *communications service* with interaction with the server, to provide the computer with information relating to the [communication services] *communications service* installed on the computer, and to [the] other communications services available *from the server*, to monitor implementation of the communications service at the computer, and

[if] *in response to a determination* the implementation is substandard, [then] to take remedial action with respect to the implementation.

11. [The method of claim 7.] A method for providing communications services by a service provider to a user, comprising:

provisioning a computer for use by [a] *the* user on a network and functionally connected over the network to a server of the service provider, and causing the computer to be operative for ordering *a* communications [services] *service* from the server, for receiving the communications [services] *service* from the server, for installing the communications [services] *service* received from the server so the communications [services are] *service is* available for use on the computer, for executing the [communication services] *communications service* with or without interaction with the server, and for displaying information relating to the [installed communication services] *communications service installed on the computer*, and relating to other communications services available from the server; *and* provisioning the server as a communications applications support system (CASS) as functionally connected to the computer through the network, and causing the server to be operative to respond to an order from the computer for a communications service by causing the communications service to be provided to the computer, to be accessible to the computer for execution of the [communication services] *communications service* with interaction with the server, to provide the computer with information relating to the [communication services] *communications service* installed on the computer, and to other communications services available *from the server*, to monitor functionality of the communications [services] *service* at the computer, and

[if] *in response to a determination* the functionality is substandard, [then] to take remedial action with respect to the implementation of the communications [services] *service* at the computer.

12. A method for providing communications services by a service provider to a user, comprising:

provisioning a computer for use by [a] *the* user on a network and functionally connected over the network to a server of the service provider, and causing the computer to be operative for ordering *a* communications [services] *service* from the server, for receiving the communications [services] *service* from the server, for installing the communications [services] *service* received from the server so the communications [services are] *service is* available for use on the computer, for executing the [communication services] *communications service* with or without interaction with the server, and for displaying information relating to [the installed communication services] *communications service installed on the computer*, and relating to other communications services available from the server; *and* provisioning the server as a communications applications support system (CASS) as functionally connected to the computer through the network, and causing the server to be operative to respond to an order from the computer for a communications service by causing the communications service to be provided to the computer, to be accessible to the computer for execution of the [communication services] *communications service* with interaction with the server, to provide the computer with information relating to the [communication services] *communications service* installed on the computer, and to the other communications services available *from the server*, to receive an upgrade to one of the communications services implemented at the computer, [and]

to cause the upgrade to the one of the communications services to be implemented at the computer*;*

*to monitor implementation of the selected communications service, including the upgrade, at the computer, and*

*in response to a determination the implementation is substandard, to take remedial action with respect to the implementation*.

13. A system for providing a user with [a variable slate of] communications services implemented through a computer of the user, the system comprising:

a server *configured for authenticating a certificate of the computer of the user and* for implementing or deleting selected communications services on or in connection with [a] *the authenticated* computer of the user*, over an external network connecting the server to the computer of the user*;

the server [also] including a database [having] *configured for storing* data relating to the user, or to the selected communications services provided to the user;

[a network connecting the server to the computer of the user; and]

the computer [operative to receive and implement] *being configured for receiving and implementing* the selected communications services for use on the computer or for use on the computer in connection with the server, and the computer *further* being [operative to receive] *configured for receiving* instructions from the user on implementation or deletion of any communications service on the computer or on the computer in connection with the server, and [to communicate] *for communicating* over the *external* network with the server to obtain the implementation or deletion of the any communications service.

14. The system of claim 13, wherein the server comprises a communications applications support system (CASS).

15. The system of claim 13, wherein the server is operative to provide the computer with information on communications services available from the server; and wherein the computer is operative to display the information.

16. A system for providing a user with [a variable slate of] communications services implemented through a computer of the user, the system comprising:

a server *configured* for implementing or deleting selected communications services on or in connection with [a] *the* computer of the user*, over an external network connecting the server to the computer of the user*;

the server [also] including a database [having] *configured for storing* data relating to the user, or to the selected communications services provided to the user;

[a network connecting the server to the computer of the user;]

the computer [operative to receive and implement] *being configured for receiving and implementing* the selected communications services for use on the computer or for use on the computer in connection with the server, *and* the computer *further* being [operative to receive] *configured for receiving* instructions from the user on implementation or deletion of any communications service on the computer or on the computer in connection with the server, and [to communicate] *for communicating* over the *external* network with the server to obtain the implementation or deletion of the any communications service; [and]

wherein the server *further* is [operative to monitor] *configured for monitoring* implementation of the selected communications services or the any communications service on the computer or for use on the computer in connection with the server, and

[if] *in response to a determination* the implementation is substandard, [then to take] *for taking* remedial action with respect to the implementation.

17. A system for providing a user with [a variable slate of] communications services implemented through a computer of the user, the system comprising:

a server *configured* for implementing or deleting selected communications services on or in connection with [a] *the* computer of the user*, over an external network connecting the server to the computer of the user*;

the server [also] including a database [having] *configured for storing* data relating to the user, or to the selected communications services provided to the user;

[a network connecting the server to the computer of the user;]

the computer [operative to receive and implement] *being configured for receiving and implementing* the selected communications services for use on the computer or for use on the computer in connection with the server, *and* the computer *further* being [operative to receive] *configured for receiving* instructions from the user on implementation or deletion of any communications service on the computer or on the computer in connection with the server, and [to communicate] *for communicating* over the *external* network with the server to obtain the implementation or deletion of the any communications service; [and]

wherein the server *further* is [operative to monitor] *configured for monitoring implementation or* deletion of the any communications [services] *service* on the computer or for use on the computer in connection with the server, and

[if] *in response to a determination* the implementation is substandard, [then to take] *for taking* remedial action with respect to the implementation.

18. A system for providing a user with [a variable slate of] communications services implemented through a computer of the user, the system comprising:

a server *configured* for implementing or deleting selected communications services on or in connection with [a] *the* computer of the user*, over an external network connecting the server to the computer of the user*;

the server [also] including a database [having] *configured for storing* data relating to the user, or to the selected communications services provided to the user;

[a network connecting the server to the computer of the user;]

the computer [operative to receive and implement] *being configured for receiving and implementing* the selected communications services for use on the computer or for use on the computer in connection with the server, *and* the computer *further* being [operative to receive] *configured for receiving* instructions from the user on implementation or deletion of any communications service on the computer or on the computer in connection with the server, and [to communicate] *for communicating* over the *external* network with the server to obtain the implementation or deletion of the any communications service; [and]

wherein the server *further* is [operative to monitor] *configured for monitoring* functionality of the selected communications services at the computer, and

[if] *in response to a determination* the functionality is substandard, [then to take] *for taking* remedial action with respect to the implementation.

19. A system for providing a user with [a variable slate of] communications services implemented through a computer of the user, the system comprising:

a server *configured* for implementing or deleting selected communications services on or in connection with [a] *the* computer of the user*, over an external network connecting the server to the computer of the user*;

the server [also] including a database [having] *configured for storing* data relating to the user, or to the selected communications services provided to the user;

[a network connecting the server to the computer of the user;]

the computer [operative to receive and implement] *being configured for receiving* the selected communications services for use on the computer or for use on the computer in connection with the server, *and* the computer *further* being [operative to receive] *configured for receiving* instructions from the user on implementation or deletion of any communications service on the computer or on the computer in connection with the server, and [to communicate] *for communicating* over the *external* network with the server to obtain the implementation or deletion of the any communications service; [and]

wherein the server *further* is [operative] *configured*

[to receive] *for receiving* an upgrade to one of the selected communications services implemented at the computer, [and]

[to cause] *for causing* the upgrade to the one of the selected communications services to be implemented at the computer*;*

*for monitoring implementation of the one of the selected communications services, including the upgrade, at the computer, and*

*in response to a determination the implementation is substandard, for taking remedial action with respect to the implementation*.

20. The system of claim 13, wherein the computer *further* is [operative] *configured*

[to receive] *for receiving* input from the user with respect to execution of a selected communications service in connection with the server, and

[to communicate] *for communicating* over the network with the server to obtain execution of the selected communications service; and wherein the server *further* is [receptive to] *configured for receiving* the communication from the computer and [to execute] *for executing* the selected communications service.

*21. A method for providing a set of communications applications to a service module provided by a customer of a communications application provider, comprising:*

*receiving, by a processing device associated with the communications application provider, a certificate identifying the service module;*

*authenticating the received certificate;*

*receiving, by the processing device associated with the communications application provider, a request from the service module for the set of communications applications; and*

*transmitting, by the processing device to the service module, the set of communications applications, wherein the set of communications applications is configured to be installed on the service module.*

*22. The method of claim 21, wherein a communications application in the set of communications applications is a fee-based service.*

*23. The method of claim 21, further comprising:*

*receiving, by the processing device from the service module, usage data associated with a communications application in the set of communications applications; and*

*determining a charge to be applied to a user of the communications application based on the usage data.*

*24. The method of claim 21, wherein a communications application in the set of communications applications includes educational information associated with the communications application.*

*25. A method for providing a set of communications applications to a service module provided by a customer of a communications application provider, comprising:*

*receiving, by a processing device associated with the communications application provider, a request from the service module for the set of communications applications;*

*transmitting, by the processing device to the service module, the set of communications applications, wherein the set of communications applications is configured to be installed on the service module; and*

*providing, by the processing device to the service module, information regarding a communications application in the set of communications applications available for remote installation.*

*26. The method of claim 21, further comprising:*

*receiving, by the processing device, a password from the service module requesting the set of communications applications; and*

*verifying the password prior to transmitting the requested set of communications applications.*

*27. The method of claim 21, wherein the set of communications applications includes an IP telephony service.*

*28. The method of claim 21, wherein the set of communications applications includes a call delivery service.*

*29. The method of claim 21, wherein the set of communications applications includes a messaging service.*

*30. The method of claim 21, wherein the set of communications applications includes a facsimile service.*

*31. The method of claim 21, wherein the set of communications applications includes a data transport service.*

*32. The method of claim 21, wherein the set of communications applications includes an electronic commerce service.*

*33. The method of claim 21, wherein the set of communications applications includes a remote access service.*

*34. The method of claim 21, wherein the set of communications applications includes a message delivery service.*

*35. The method of claim 21, further comprising:*

*transmitting, by the processing device, a message informing the service module that an upgrade to a communications application in the set of communications applications is available.*

*36. The method of claim 21, further comprising:*

*receiving, by the processing device, a request from the service module for an upgrade to a communications application in the set of communications applications; and*

*transmitting, by the processing device to the service module, the requested upgrade.*

*37. The method of claim 21, further comprising:*

*receiving, by the processing device, a request from the service module for removal of a communications application in the set of communications application; and*

*transmitting, by the processing device to the service module, instructions for removing the communications application.*

*38. The method of claim 21, further comprising:*

*providing information regarding a communications application in a set of communications applications available for remote installation.*

*39. The method of claim 21, further comprising:*

*receiving, by the processing device from the service module, a request to invoke a communications application; and*

*executing the requested communications application in response to a determination the service module is authorized to access the requested communications application.*

*40. A system for providing a set of communications services to a service node provided by a customer of an application provider, comprising:*

*means for storing a plurality of communications services; and*

*a module configured to*

*receive a certificate identifying the service node,*

*authenticate the certificate, and*

*transmit, in response to receipt of a request from the service node, a set of communications services of the plurality of communications services from the means for storing to the service node, wherein the set of communications services is configured to be installed on the service node.*

*41. The system of claim 40, wherein the storing means stores a service profile for the customer.*

*42. The system of claim 41, wherein the storing means stores a service profile for a user associated with the customer.*

*43. The system of claim 40, wherein the storing means stores usage information associated with the customer.*

*44. The system of claim 40, wherein a communications service in the set of communications services is a fee-based service.*

*45. The system of claim 40, wherein the module is further configured to:*

*receive from the service node usage data associated with a communications service; and*

*determine a charge to be applied to a user of the communications service based on the usage data.*

*46. The system of claim 40, wherein a communications service in the set of communications services includes educational information associated with the communications service.*

*47. The system of claim 40, wherein the module is further configured to:*

*receive a password from the service node requesting the set of communications services; and*

*verify the password prior to transmitting the requested set of communications services.*

*48. The system of claim 40, wherein the set of communications services includes an IP telephony service.*

*49. The system of claim 40, wherein the set of communications services includes a call delivery service.*

*50. The method of claim 40, wherein the set of communications services includes a messaging service.*

*51. The system of claim 40, wherein the set of communications services includes a facsimile service.*

*52. The system of claim 40, wherein the set of communications services includes a data transport service.*

*53. The system of claim 40, wherein the set of communications services includes an electronic commerce service.*

*54. The system of claim 40, wherein the set of communications services includes a remote access service.*

*55. The system of claim 40, wherein the set of communications services includes a message delivery service.*

*56. The system of claim 40, wherein the module is further configured to:*

*transmit a message informing the service node that an upgrade to a communications service in the set of communications services is available.*

*57. The system of claim 40, wherein the module is further configured to:*

*receive from the service node a request for an upgrade to a communications service in the set of communications services; and*

*transmit the requested upgrade to the service node.*

*58. The system of claim 40, wherein the module is further configured to:*

*receive from the service node a request for removal of a communications service in the set of communications services; and*

*transmit to the service node instructions for removing the communications service.*

*59. The system of claim 40, wherein the module is further configured to:*

*provide information regarding a communications service in the set of communications services available for remote installation.*

*60. The system of claim 40, wherein the module is further configured to:*

*receive from the service node a request to invoke a communications service in the set of communications services; and*

*execute the requested communications service in response to a determination the requesting service node is authorized to access the requested communications service.*

*61. The system of claim 40, further comprising:*

*a media gateway configured to receive communications in accordance with a plurality of communications protocols and to route the communications to the service node.*

*62. The system of claim 61, wherein the media gateway is coupled to a public data network and to a public switched telephone network.*

*63. The system of claim 61, wherein the media gateway is configured to route the communications to a user device based on user routing instructions provided by the service node.*

*64. A system for providing a set of communications services to a service node provided by a customer of an application provider, comprising:*

*means for storing a plurality of communications services; and*

*a module configured to transmit, in response to receipt of a request from the service node, a set of communications services of the plurality of communications services from the storing means to the service node, and to provide information regarding a communications service in the set of communications services available for remote installation,*

*wherein the set of communications services is configured to be installed on the service node.*

*65. A computer-readable storage medium having stored thereon computer executable instructions, execution of which by a computing device causes the computing device to perform operations enabling the provision of a set of communications services on a service module provided by a customer of a service provider, the operations comprising:*

*receiving a certificate identifying the service module;*

*authenticating the certificate;*

*receiving from the service module a request for a set of communications services from the service module; and*

*transmitting the requested set of communications services to the service module,*

*wherein the set of communications services is configured to be installed on the service module.*

*66. The computer-readable storage medium of claim 65, wherein a communications service in the set of communications services is a fee-based service.*

*67. The computer-readable storage medium of claim 65, wherein the operations further comprise:*

*receiving from the service module usage data associated with a communications service in the set of communications services; and*

*determining a charge to be applied to a user of the communications service based on the usage data.*

*68. The computer-readable storage medium of claim 65, wherein a communications service in the set of communications services includes educational information associated with the communications service.*

*69. The computer-readable storage medium of claim 65, wherein the operations further comprise:*

*receiving a password from the service module requesting the set of communications services; and*

*verifying the password prior to transmitting the requested set of communications services.*

*70. The computer-readable storage medium of claim 65, wherein the set of communications services includes an IP telephony service.*

*71. The computer-readable storage medium of claim 65, wherein the set of communications services includes a call delivery service.*

*72. The computer-readable storage medium of claim 65, wherein the set of communications services includes a messaging service.*

*73. The computer-readable storage medium of claim 65, wherein the set of communications services includes a facsimile service.*

*74. The computer-readable storage medium of claim 65, wherein the set of communications services includes a data transport service.*

*75. The computer-readable storage medium of claim 65, wherein the set of communications services includes an electronic commerce service.*

*76. The computer-readable storage medium of claim 65, wherein the set of communications services includes a remote access service.*

*77. The computer-readable storage medium of claim 65, wherein the set of communications services includes a message delivery service.*

*78. The computer-readable storage medium of claim 65, wherein the operations further comprise:*

*transmitting a message informing the service module that an upgrade to a communications service in the set of communications services is available.*

*79. The computer-readable storage medium of claim 65, wherein the operations further comprise:*

*receiving from the service module a request for an upgrade to a communications service in the set of communications services; and*

*transmitting the requested upgrade to the service module.*

*80. The computer-readable storage medium of claim 65, wherein the operations further comprise:*

*receiving from the service module a request for removal of a communications service in the set of communications services; and*

*transmitting to the service module instructions for removing the communications service.*

*81. The computer-readable storage medium of claim 65, wherein the operations further comprise:*

*providing information regarding a communication service in the set of communications services available for remote installation.*

*82. The computer-readable storage medium of claim 65, wherein the operations further comprise:*

*receiving from the service module a request to invoke a communications service in the set of communications services; and*

*executing the requested communications service in response to a determination the service module is authorized to access the requested communications service.*

*83. A computer-readable storage medium having stored thereon computer executable instructions, execution of which by a computing device causes the computing device to perform operations enabling the provision of a set of communications services on a service module provided by a customer of a service provider, the operations comprising:*

*receiving from the service module a request for a set of communications services from the service module; and*

*transmitting the requested set of communications services to the service module, and providing information regarding a communications service in the set of communications services available for remote installation,*

*wherein the set of communications services is configured to be installed on the service module.*

*84. A method for providing a set of communications services at a service module provided by a customer of a communications service provider, comprising:*

*authenticating a service platform of the service module to a server by transmitting a certificate to the server, wherein the server is provided by the communications service provider;*

*modifying by the service module the set of communications services provided at the service module based on a request from a user of the service module;*

*receiving by the service module a request to invoke a communications service in the modified set of communications services; and*

*invoking by the service module the requested communications service.*

*85. The method of claim 84, wherein modifying the set of communications services comprises:*

*adding a communications service to the set of communications services.*

*86. The method of claim 84, wherein modifying the set of communications services comprises:*

*removing a communications service from the set of communications services.*

*87. The method of claim 84, wherein modifying the set of communications services comprises:*

*upgrading a communications service in the set of communications services.*

*88. The method of claim 84, further comprising:*

*generating and storing usage data associated with the use of the requested communications service.*

*89. The method of claim 84, wherein the set of communications services provided at the service module includes a fee-based communications service.*

*90. The method of claim 89, wherein said receiving a request to invoke a communications service comprises:*

*receiving a request to invoke the fee-based communications service.*

*91. The method of claim 88, further comprising:*

*determining a cost for a use of the requested communications service based on the generated usage data.*

*92. The method of claim 84, further comprising:*

*defining first and second user groups, wherein a first set of individuals is associated with the first user group and a second set of individuals is associated with the second group; and*

*assigning access rights to the plurality of communications services per the defined first and second user groups.*

*93. The method of claim 92, wherein said receiving a request to invoke a communications service includes identifying an individual making the request.*

*94. The method of claim 93, further comprising:*

*determining access rights of the individual to the requested communications service based on a user group membership of the individual.*

*95. The method of claim 84, further comprising:*

*providing educational information regarding one or more communications service in the set of communications services.*

*96. The method of claim 84, wherein modifying the set of communications services comprises:*

*transmitting to the server a request for an additional communications service;*

*receiving from the server the requested additional communications service; and*

*installing the requested additional communications service.*

*97. The method of claim 96, further comprising:*

*authenticating the service platform to the server prior to transmitting the request.*

*98. The method of claim 96, further comprising, prior to transmitting the request:*

*authenticating a service platform to the server via a password assigned by the communications service provider to a provider of the service platform.*

*99. The method of claim 84, wherein the set of communications services includes an IP telephony service.*

*100. The method of claim 84, wherein the set of communications services includes a call delivery service.*

*101. The method of claim 100, further comprising:*

*receiving call delivery data for an individual.*

*102. The method of claim 101, wherein said receiving a request to invoke a communications service comprises:*

*receiving a request to invoke the call delivery service, wherein the request identifies the individual.*

*103. The method of claim 102, further comprising:*

*receiving a call for the individual; and*

*routing the call based on the call delivery data for the individual.*

*104. The method of claim 84, wherein the set of communications services includes a messaging service.*

*105. The method of claim 84, wherein the set of communications services includes a facsimile service.*

*106. The method of claim 84, wherein the set of communications services includes a data transport service.*

*107. The method of claim 84, wherein the set of communications services includes an electronic commerce service.*

*108. The method of claim 84, wherein the set of communications services includes a remote access service.*

*109. The method of claim 84, wherein the set of communications services includes a message delivery service.*

*110. The method of claim 109, further comprising:*

*receiving message delivery data for an individual, wherein the message delivery data defines a communication medium for delivery of received messages for the individual.*

*111. The method of claim 110, wherein said receiving a request to invoke a communications service comprises:*

*receiving a request to invoke the message delivery service, wherein the request identifies the individual.*

*112. The method of claim 111, further comprising:*

*receiving a message for the individual; and*

*routing the message based on the message delivery data for the individual.*

*113. The method of claim 84, further comprising:*

*receiving by the service module an upgrade to the communications service in the set of communications services; and*

*installing the upgrade to the communications service.*

*114. The method of claim 84, wherein modifying the set of communications services comprises:*

*transmitting to the server a request to remove a communications service from the set of communications services; and*

*removing the communications service.*

*115. The method of claim 84, further comprising:*

*transmitting usage data to the server, wherein the server provides a bill based on the usage data.*

*116. The method of claim 84, wherein a communications service in the set of communications services is provided on the server.*

*117. The method of claim 116, further comprising:*

*transmitting a request to invoke the communications service provided on the server; and*

*coupling a user device to the server for use of the communications service.*

*118. A service node for providing a set of communications services at a location remote from a communications service provider, comprising:*

*means for storing the set of communications services; and*

*a service module configured to modify the set of communications services upon request from a user of the service node,*

*wherein the means for storing stores an authentication certificate identifying the service node,*

*wherein the service module is configured to authenticate the service node to a server using the authentication certificate, and*

*wherein the server is provided by the communications service provider.*

*119. The service node of claim 118, wherein the service module is further configured to invoke an instance of a communications service in the set of communications services upon receipt of a request for the communications service.*

*120. The service node of claim 118, wherein the service module is configured to add a communications service to the set of communications services.*

*121. The service node of claim 118, wherein the service module is configured to remove a communications service from the set of communications services.*

*122. The service node of claim 118, wherein the service module is configured to upgrade a communications service in the set of communications services.*

*123. The service node of claim 118, wherein the service module is further configured to generate and store usage data associated with use of the set of communications services.*

*124. The service node of claim 123, wherein the usage data includes indication of users of communications allowed by the set of communications services.*

*125. The service node of claim 123, wherein the usage data includes indication of recipients of communications enabled by the set of communications services.*

*126. The service node of claim 123, wherein the usage data includes statistics related to the use of the set of communications services.*

*127. The service node of claim 118, wherein a communications service in the set of communications services is a fee-based service.*

*128. The service node of claim 118, wherein the set of communications services includes an IP telephony service.*

*129. The service node of claim 118, wherein the set of communications services includes a call delivery service.*

*130. The service node of claim 129, wherein the means for storing stores call delivery data for a user.*

*131. The service node of claim 130, wherein the service module is further configured to route a call received for a user based on the stored call delivery data for the user.*

*132. The service node of claim 118, wherein the set of communications services includes a messaging service.*

*133. The service node of claim 118, wherein the set of communications services includes a facsimile service.*

*134. The service node of claim 118, wherein the set of communications services includes a data transport service.*

*135. The service node of claim 118, wherein the set of communications services includes an electronic commerce service.*

*136. The service node of claim 118, wherein the set of communications services includes a remote access service.*

*137. The service node of claim 118, wherein the set of communications services includes a message delivery service.*

*138. The service node of claim 137, wherein the means for storing stores message delivery data for a user.*

*139. The service node of claim 138, wherein the service module is further configured to route a message received for the user based on the stored message delivery data for the user.*

*140. The service node of claim 118, wherein:*

*the means for storing stores educational information regarding a communications service in the set of communications services; and*

*the service module is configured to provide, upon request, educational information associated with the communication service.*

*141. The service node of claim 120, wherein the service module is further configured to:*

*transmit to the server a request for an additional communications service;*

*receive the requested additional communications service from the server; and*

*install the requested additional communications service.*

*142. The service node of claim 118, wherein the service module is configured to authenticate the service node to the server prior to the request for the communications service.*

*143. The service node of claim 118, wherein the service module further is configured to receive a password from a user of the service node and to authenticate the service node to a server using the received password.*

*144. The service node of claim 122, wherein the service module is further configured to:*

*transmit to the server a request for an upgrade to a communications service;*

*receive the requested upgrade from the server; and*

*install the requested upgrade on the service node.*

*145. The service node of claim 121, wherein the service module is further configured to:*

*transmit to the server a request to remove a communication service;*

*receive acknowledgment of the removal request from the server; and*

*remove the communication service from the service node.*

*146. The service node of claim 118, wherein a communications service in the set of communications services is provided on a remote server.*

*147. The service node of claim 146, wherein the service module is further configured to:*

*transmit a request to invoke the communications service provided on the remote server; and*

*couple a user device to the remote server for use of the communications service.*

*148. A computer-readable storage medium having stored thereon computer executable instructions, execution of which by a computing device causes the computing device to perform operations enabling the provision of a set of communications services at a service module provided by a customer of a communications service provider, the operations comprising:*

*authenticating a service platform of the service module to a server via a certificate identifying the service platform, wherein the server is provided by the communications service provider;*

*modifying by the service module the set of communications services based on a request from a user of the service module;*

*receiving by the service module a request to invoke a communications service in the set of communications services; and*

*invoking the requested communications service.*

*149. The computer-readable storage medium of claim 148, wherein the operation of modifying the set of communications services comprises:*

*adding a communications service to the set of communications services.*

*150. The computer-readable storage medium of claim 148, wherein the operation of modifying the set of communications services comprises:*

*removing a communications service from the set of communications services.*

*151. The computer-readable storage medium of claim 148, wherein the operation of modifying the set of communications services comprises:*

*upgrading a communications service in the set of communications services.*

*152. The computer-readable storage medium of claim 148, wherein the operations further comprise:*

*generating and storing usage data associated with a use of the requested communications service.*

*153. The computer-readable storage medium of claim 148, wherein a communication service in the set of communications services is a fee-based service.*

*154. The computer-readable storage medium of claim 153, wherein the operation of receiving the request to invoke a communications service comprises:*

*receiving a request to invoke the fee-based communications service.*

*155. The computer-readable storage medium of claim 152, wherein the operations further comprise:*

*determining a cost for the use of the requested communications service based on the generated usage data.*

*156. The computer-readable storage medium of claim 148, wherein the operations further comprise:*

*defining first and second user groups, wherein a first set of individuals is associated with the first user group and a second set of individuals is associated with the second group; and*

*assigning access rights to the plurality of communications services per the defined first and second user groups.*

*157. The computer-readable storage medium of claim 156, wherein the request to invoke a communications service identifies an individual making the request.*

*158. The computer-readable storage medium of claim 157, wherein the operations further comprise:*

*determining access rights of the individual to the requested communications service based on a user group membership of the individual.*

*159. The computer-readable storage medium of claim 148, wherein the operations further comprise:*

*providing educational information regarding the set of communications services.*

*160. The computer-readable storage medium of claim 148, wherein the operations further comprise:*

*transmitting to the server a request for an additional communications service;*

*receiving the requested additional communications service from the server; and*

*installing the requested additional communications service.*

*161. The computer-readable storage medium of claim 160, wherein the operations further comprise:*

*authenticating the service platform to the server prior to transmitting the request.*

*162. The computer-readable storage medium of claim 160, wherein the operations further comprise:*

*authenticating the service platform to the server via a password assigned by the communications service provider to a provider of the service platform.*

*163. The computer-readable storage medium of claim 148, wherein the set of communications services includes an IP telephony service.*

*164. The computer-readable storage medium of claim 148, wherein the set of communications services includes a call delivery service.*

*165. The computer-readable storage medium of claim 164, wherein the operations further comprise:*

*receiving call delivery data for an individual.*

*166. The computer-readable storage medium of claim 165, wherein the operation of receiving the request to invoke a communications service comprises:*

*receiving a request to invoke the call delivery service, wherein the request identifies the individual.*

*167. The computer-readable storage medium of claim 166, wherein the operations further comprise:*

*receiving a call for the individual; and*

*routing the call based on the call delivery data for the individual.*

*168. The computer-readable storage medium of claim 148, wherein the set of communications services includes a messaging service.*

*169. The computer-readable storage medium of claim 148, wherein the set of communications services includes a facsimile service.*

*170. The computer-readable storage medium of claim 148, wherein the set of communications services includes a data transport service.*

*171. The computer-readable storage medium of claim 148, wherein the set of communications services includes an electronic commerce service.*

*172. The computer-readable storage medium of claim 148, wherein the set of communications services includes a remote access service.*

*173. The computer-readable storage medium of claim 148, wherein the set of communications services includes a message delivery service.*

*174. The computer-readable storage medium of claim 173, wherein the operations further comprise:*

*receiving message delivery data for an individual, wherein the message delivery data defines a communication medium for delivery of received messages for the individual.*

*175. The computer-readable storage medium of claim 174, wherein the operation of receiving the request to invoke a communications service comprises:*

*receiving a request to invoke the message delivery service, wherein the request identifies the individual.*

*176. The computer-readable storage medium of claim 175, wherein the operations further comprise:*

*receiving a message for the individual; and*

*routing the message based on the message delivery data for the individual.*

*177. The computer-readable storage medium of claim 148, wherein the operations further comprise:*

*transmitting to the server a request to remove a communications service from the set of communications services; and*

*removing the communications service.*

*178. The computer-readable storage medium of claim 148, wherein the operations further comprise:*

*transmitting usage data to the server, wherein the server provides a bill based on the usage data.*

*179. The computer-readable storage medium of claim 148, wherein a communications service in the set of communications services is provided on the server.*

*180. The computer-readable storage medium of claim 179, wherein the operations further comprise:*

*transmitting a request to invoke a communications service provided on the server; and*

*coupling a user device to the server for use of the communications service.*

*181. A method for providing a set of communications services on a customer platform provided by a customer of a communications service provider, comprising:*

*authenticating the customer platform to a remote server via a certificate identifying the customer platform, wherein the remote server is provided by the communications service provider;*

*requesting, by the customer platform to the remote server, the set of communications services;*

*receiving the set of requested communications services from the remote server; and*

*installing the set of requested communications services on the customer platform.*

*182. The method of claim 181, further comprising:*

*receiving by the customer platform a request to invoke a communications service in the set of communications services; and*

*executing the requested communications service.*

*183. The method of claim 181, wherein a communications service in the set of communications services is a fee-based service.*

*184. The method of claim 182, further comprising:*

*generating usage data associated with the invoked communications service.*

*185. The method of claim 184, wherein the usage data includes information associated with a recipient of the invoked communications service.*

*186. The method of claim 184, wherein the usage data includes information associated with an extent of use of the invoked communications service.*

*187. The method of claim 184, wherein the usage data includes information associated with an originator of the invoked communications service.*

*188. The method of claim 182, wherein the receiving a request to invoke a communications service comprises:*

*receiving a request to invoke a fee-based communications service.*

*189. The method of claim 184, further comprising:*

*determining a cost for a use of the requested communications service based on the generated usage data.*

*190. The method of claim 181, further comprising:*

*defining first and second user groups, wherein a first set of users is associated with the first user group and a second set of users is associated with the second group; and*

*assigning access rights to the set of communications services per the defined first and second user groups.*

*191. The method of claim 190, further comprising:*

*receiving by the customer platform a request to invoke a communications service in the set of communications services, wherein the request to invoke a communications service identifies a user making the request.*

*192. The method of claim 191, further comprising:*

*determining access rights of the user to the requested communications service based on a user group membership of the user.*

*193. The method of claim 181, further comprising:*

*receiving by the customer platform a request for educational information regarding a communications service; and*

*providing the requested educational information.*

*194. The method of claim 181, further comprising:*

*transmitting, by the customer platform to the remote server, a request for an additional communications service;*

*receiving the requested additional communications service from the remote server; and*

*installing the requested additional communications service on the customer platform.*

*195. The method of claim 194, further comprising:*

*authenticating the customer platform to the remote server prior to transmitting the request.*

*196. The method of claim 194, further comprising, prior to transmitting the request:*

*authenticating a customer platform to the server via a password assigned by the communications service provider to a provider of the customer platform.*

*197. The method of claim 181, wherein the set of communications services includes an IP telephony service.*

*198. The method of claim 181, wherein the set of communications services includes a call delivery service.*

*199. The method of claim 198, further comprising:*

*receiving call delivery data for a user.*

*200. The method of claim 199, further comprising:*

*receiving a request to invoke a communications service in the set of communications services; and*

*executing the requested communications service,*

*wherein receiving the request to invoke a communications service comprises:*

*receiving a request to invoke the call delivery service, and*

*wherein the request identifies the user.*

*201. The method of claim 200, further comprising:*

*receiving a call for the user; and*

*routing the call based on the call delivery data for the user.*

*202. The method of claim 181, wherein the set of communications services includes a messaging service.*

*203. The method of claim 181, wherein the set of communications services includes a facsimile service.*

*204. The method of claim 181, wherein the set of communications services includes a data transport service.*

*205. The method of claim 181, wherein the set of communications services includes an electronic commerce service.*

*206. The method of claim 181, wherein the set of communications services includes a remote access service.*

*207. The method of claim 181, wherein the set of communications services includes a message delivery service.*

*208. The method of claim 207, further comprising:*

*receiving message delivery data for a user, wherein the message delivery data defines a communication medium for delivery of received messages for the user.*

*209. The method of claim 208, further comprising:*

*receiving a request to invoke a communications service in the set of communications services; and*

*executing the requested communications service,*

*wherein receiving the request to invoke a communications service comprises:*

*receiving a request to invoke the message delivery service, and*

*wherein the request to invoke the message delivery service identifies the user.*

*210. The method of claim 209, further comprising:*

*receiving a message for the user; and*

*routing the message based on the message delivery data for the user.*

*211. The method of claim 181, further comprising:*

*receiving, by the customer platform from the remote server, an upgrade to a communications service in the set of communications services; and*

*installing the upgrade to the communications service.*

*212. The method of claim 181, further comprising:*

*transmitting, by the customer platform to the remote server, a request to remove a communications service from the set of communications services; and*

*removing the communications service from the customer platform.*

*213. The method of claim 181, further comprising:*

*transmitting usage data to the remote server, wherein the remote server provides a bill based on the usage data.*

*214. The method of claim 181, wherein a communications service in the set of communications services is provided on the remote server.*

*215. The method of claim 214, further comprising:*

*transmitting a request to invoke a communications service provided on the remote server; and*

*coupling a user device to the remote server for use of the communications service.*

*216. A service node for providing a set of communications services at a location remote from a communications service provider, comprising:*

*means for storing the set of communications services and an authentication certificate identifying the service node; and*

*a service module configured to authenticate the service node to the remote server using the authentication certificate, to request the set of communications services from a remote server, and to install the set of requested communications services at the service node.*

*217. The service node of claim 216, wherein the service module is further configured to invoke an instance of a communications service in the set of communications services upon receipt of a request for the communications service.*

*218. The service node of claim 216, wherein the service module is configured to add a communications service to the set of communications services.*

*219. The service node of claim 216, wherein the service module is configured to remove a communications service from the set of communications services.*

*220. The service node of claim 216, wherein the service module is configured to upgrade a communications service in the set of communications services.*

*221. The service node of claim 216, wherein the service module is further configured to generate and store usage data associated with use of the plurality of communications services.*

*222. The service node of claim 221, wherein the usage data includes indication of users of communications enabled by the plurality of communications services.*

*223. The service node of claim 221, wherein the usage data includes indication of recipients of communications enabled by the plurality of communications services.*

*224. The service node of claim 221, wherein the usage data includes statistics related to the use of the plurality of communications services.*

*225. The service node of claim 216, wherein a communications service in the set of communications services is a fee-based service.*

*226. The service node of claim 216, wherein the set of communications services includes an IP telephony service.*

*227. The service node of claim 216, wherein the set of communications services includes a call delivery service.*

*228. The service node of claim 227, wherein the means for storing stores call delivery data for a user.*

*229. The service node of claim 228, wherein the service module is further configured to route a call received for a user based on the stored call delivery data for the user.*

*230. The service node of claim 216, wherein the set of communications services includes a messaging service.*

*231. The service node of claim 216, wherein the set of communications services includes a facsimile service.*

*232. The service node of claim 216, wherein the set of communications services includes a data transport service.*

*233. The service node of claim 216, wherein the set of communications services includes an electronic commerce service.*

*234. The service node of claim 216, wherein the set of communications services includes a remote access service.*

*235. The service node of claim 216, wherein the set of communications services includes a message delivery service.*

*236. The service node of claim 235, wherein the means for storing stores message delivery data for a user.*

*237. The service node of claim 236, wherein the service module is further configured to route a message received for the user based on the stored message delivery data for the user.*

*238. The service node of claim 216, wherein;*

*the storage means stores educational information regarding a communications service in the set of communications services, and*

*the service module is configured to provide, upon request, educational information associated with the communication service.*

*239. The service node of claim 218, wherein the service module is further configured to:*

*transmit to the remote server a request for an additional communications service;*

*receive the requested additional communications service from the remote server; and*

*install the requested additional communications service.*

*240. The service node of claim 216, wherein the service module is configured to authenticate the service node to the remote server prior to the request for the set of communications services from the remote server.*

*241. The service node of claim 216, wherein the service module is further configured to receive a password from a user of the service node and to authenticate the service node to the remote server using the received password.*

*242. The service node of claim 220, wherein the service module is further configured to:*

*transmit to the remote server a request for an upgrade to a communications service, wherein the remote server is provided by the communications service provider;*

*receive the requested upgrade from the remote server; and*

*install the requested upgrade on the service node.*

*243. The service node of claim 216, wherein a communications service in the set of communications services is provided on the remote server.*

*244. The service node of claim 243, wherein the service module is further configured to:*

*transmit a request to invoke the communications service provided on the remote server; and*

*couple a user device to the remote server for use of the communications service.*

*245. A service node for providing a set of communications services at a location remote from a communications service provider, comprising:*

*means for storing the set of communications services; and*

*a service module configured to*

*request the set of communications services from a remote server, wherein the remote server is provided by the communications service provider;*

*install the set of requested communications services at the service node;*

*transmit to the remote server a request to remove a communication service in the set of communications services;*

*receive acknowledgment of the removal request from the remote server; and*

*remove the communication service from the set of communications services at the service node.*

*246. A computer-readable storage medium having stored thereon computer executable instructions, execution of which by a computing device causes the computing device to perform operations enabling the provision of a set of communications services on a customer platform provided by a customer of a service provider, the operations comprising:*

*authenticating the customer platform to the remote server via a certificate identifying the customer platform;*

*requesting a set of communications services from a remote server;*

*receiving the set of requested communications services from the remote server; and*

*installing the set of requested communications services on the customer platform.*

*247. The computer-readable storage medium of claim 246, the operations further comprising:*

*receiving a request to invoke a communications service in the set of communications services; and*

*executing the requested communications service.*

*248. The computer-readable storage medium of claim 246, wherein a communications service in the set of communications services is a fee-based service.*

*249. The computer-readable storage medium of claim 246, the operations further comprising:*

*generating usage data associated with the invoked communications service.*

*250. The computer-readable storage medium of claim 249, wherein the usage data includes information associated with a recipient of the invoked communications service.*

*251. The computer-readable storage medium of claim 249, wherein the usage data includes information associated with an extent of use of the invoked communications service.*

*252. The computer-readable storage medium of claim 249, wherein the usage data includes information associated with an originator of the invoked communications service.*

*253. The computer-readable storage medium of claim 248, wherein the operation of receiving the request to invoke a communications service comprises:*

*receiving a request to invoke the fee-based communications service.*

*254. The computer-readable storage medium of claim 249, the operations further comprising:*

*determining a cost for a use of the requested communications service based on the generated usage data.*

*255. The computer-readable storage medium of claim 246, the operations further comprising:*

*defining first and second user groups, wherein a first set of users is associated with the first user group and a second set of users is associated with the second group; and*

*assigning access rights to the set of communications services per the first and second defined user groups.*

*256. The computer-readable storage medium of claim 255, wherein the request to invoke a communications service identifies a user making the request.*

*257. The computer-readable storage medium of claim 256, the operations further comprising:*

*determining access rights of the user to the requested communications service based on a user group membership of the user.*

*258. The computer-readable storage medium of claim 246, the operations further comprising:*

*receiving a request for educational information regarding a communications service; and*

*providing the requested educational information.*

*259. The computer-readable storage medium of claim 246, the operations further comprising:*

*transmitting to the remote server a request for an additional communications service;*

*receiving the requested additional communications service from the remote server; and*

*installing the requested additional communications service.*

*260. The computer-readable storage medium of claim 259, the operations further comprising:*

*authenticating the customer platform to the remote server prior to transmitting the request.*

*261. The computer-readable storage medium of claim 246, the operations further comprising:*

*authenticating the customer platform to the remote server via a password assigned by the communications service provider to a provider of the customer platform.*

*262. The computer-readable storage medium of claim 246, wherein the set of communications services includes an IP telephony service.*

*263. The computer-readable storage medium of claim 246, wherein the set of communications services includes a call delivery service.*

*264. The computer-readable storage medium of claim 263, the operations further comprising:*

*receiving call delivery data for a user.*

*265. The computer-readable storage medium of claim 264, the operations further comprising:*

*receiving a request to invoke a communications service in the set of communications services; and*

*executing the requested communications service,*

*wherein the operation of receiving the request to invoke a communications service comprises:*

*receiving a request to invoke the call delivery service, and*

*wherein the request to invoke the call delivery service identifies the user.*

*266. The computer-readable storage medium of claim 265, the operations further comprising:*

*receiving a call for the user; and*

*routing the call based on the call delivery data for the user.*

*267. The computer-readable storage medium of claim 246, wherein the set of communications services includes a messaging service.*

*268. The computer-readable storage medium of claim 246, wherein the set of communications services includes a facsimile service.*

*269. The computer-readable storage medium of claim 246, wherein the set of communications services includes a data transport service.*

*270. The computer-readable storage medium of claim 246, wherein the set of communications services includes an electronic commerce service.*

*271. The computer-readable storage medium of claim 246, wherein the set of communications services includes a remote access service.*

*272. The computer-readable storage medium of claim 246, wherein the set of communications services includes a message delivery service.*

*273. The computer-readable storage medium of claim 272, the operations further comprising:*

*receiving message delivery data for a user, wherein the message delivery data defines a communication medium for delivery of received messages for the user.*

*274. The computer-readable storage medium of claim 273, the operations further comprising:*

*receiving a request to invoke a communications service in the set of communications services; and*

*executing the requested communications service,*

*wherein the operation of receiving the request to invoke a communications service comprises:*

*receiving a request to invoke the message delivery service, and*

*wherein the request to invoke the message deliver service identifies the user.*

*275. The computer-readable storage medium of claim 246, the operations further comprising:*

*receiving an upgrade to a communications service in the set of communications services; and*

*installing the upgrade to the communications service.*

*276. The computer-readable storage medium of claim 246, the operations further comprising:*

*transmitting to the remote server a request to remove a communications service from the set of communications services; and*

*removing the communications service.*

*277. The computer-readable storage medium of claim 246, the operations further comprising:*

*transmitting usage data to the remote server, wherein the remote server provides a bill based on the usage data.*

*278. The computer-readable storage medium of claim 246, wherein a communications service in the set of communications services is provided on the remote server.*

*279. The computer-readable storage medium of claim 278, the operations further comprising:*

*transmitting to the remote server a request to invoke a communications service; and*

*coupling a user device to the remote server for use of the communications service.*

*280. The computer-readable storage medium of claim 274, the operations further comprising:*

*receiving a message for the user; and*

*routing the message based on the message delivery data for the user.*

*281. A method for providing communications services via a local area network (LAN), comprising:*

*receiving, at a service module in the LAN, a communications message for delivery to a first user of the LAN, wherein the service module includes a set of communications services for the LAN;*

*routing the received communications message over the LAN to a device associated with the first user; and*

*receiving a request from a second user to modify the set of communications services provided by the service module.*

*282. The method of claim 281, further comprising:*

*receiving a communications message via a first communications protocol and routing the communications message over the LAN via a second communications protocol.*

*283. A service node for providing a set of communications services at a location remote from a communications service provider, comprising:*

*means for storing the set of communications services and an authentication certificate identifying the service node, wherein the set of communications services is user-configurable; and*

*a service module configured to communicate with user devices via a plurality of communications protocols, and to authenticate the service node to a server using the authentication certificate, wherein the server is provided by the communications service provider.*

*284. The computer-readable storage medium of claim 148, wherein the operations further comprise:*

*receiving an upgrade to a communications service in the set of communications services; and*

*installing the upgrade to the communications service.*

* * * * *

UNITED STATES PATENT AND TRADEMARK OFFICE

CERTIFICATE OF CORRECTION

PATENT NO. : RE42,694 E
APPLICATION NO. : 11/889838
DATED : September 13, 2011
INVENTOR(S) : Coffee It is certified that error appears in the above-identified patent and that said Letters Patent is hereby corrected as shown below:

Title Page, item (54), under "Title", in Column 1, Line 1, delete "METHOD" and insert --METHODS --.

Column 1, line 1, delete "METHOD" and insert -- METHODS --.

Column 24, line 11, in Claim 50, delete "method" and insert -- system --.

Column 39, line 13, in Claim 274, delete "deliver" and insert -- delivery --.

Signed and Sealed this
Twenty-eighth Day of February, 2012

David J. Kappos

David J. Kappos
*Director of the United States Patent and Trademark Office*